US010411814B2

(12) United States Patent
Kojima

(10) Patent No.: US 10,411,814 B2
(45) Date of Patent: Sep. 10, 2019

(54) METHOD OF DETERMINING FAILURE IN RADIO FACILITY AND MOBILE RADIO SYSTEM

(71) Applicant: NEC CORPORATION, Tokyo (JP)

(72) Inventor: Takashi Kojima, Tokyo (JP)

(73) Assignee: NEC CORPORATION, Minato-Ku, Tokyo (JP)

(*) Notice: Subject to any disclaimer, the term of this patent is extended or adjusted under 35 U.S.C. 154(b) by 65 days.

(21) Appl. No.: 15/555,690

(22) PCT Filed: Jan. 20, 2016

(86) PCT No.: PCT/JP2016/051508
§ 371 (c)(1),
(2) Date: Sep. 5, 2017

(87) PCT Pub. No.: WO2016/139982
PCT Pub. Date: Sep. 9, 2016

(65) Prior Publication Data
US 2018/0048400 A1 Feb. 15, 2018

(30) Foreign Application Priority Data
Mar. 5, 2015 (JP) ................................. 2015-043651

(51) Int. Cl.
*H04B 17/17* (2015.01)
*H04B 17/10* (2015.01)
(Continued)

(52) U.S. Cl.
CPC ............ *H04B 17/17* (2015.01); *H04B 17/10* (2015.01); *H04B 17/18* (2015.01); *H04B 17/26* (2015.01);
(Continued)

(58) Field of Classification Search
CPC ........ H04B 17/17; H04B 17/10; H04B 17/18; H04B 17/26; H04B 17/29; H04B 17/318
See application file for complete search history.

(56) References Cited

U.S. PATENT DOCUMENTS

2003/0114111 A1* 6/2003 Shepherd .................. H04L 1/20
455/67.11
2006/0084438 A1* 4/2006 Kwon .................... H04W 36/30
455/436
(Continued)

FOREIGN PATENT DOCUMENTS

JP 09-159716 A 6/1997
JP 2000-049669 A 2/2000
(Continued)

OTHER PUBLICATIONS

Communication dated Nov. 13, 2018 from the Japanese Patent Office in counterpart Japanese application No. 2017-503369.
(Continued)

Primary Examiner — Chi H Pham
Assistant Examiner — Weibin Huang
(74) Attorney, Agent, or Firm — Sughrue Mion, PLLC

(57) ABSTRACT

A failure determination method that detects a failure site in a radio facility including one or more base stations provided along a route and an antenna installed for each of the base stations along the route while being connected to the base station, a communicable zone being set for each of the base stations, the radio facility performing radio communication with a movable body that operates on the route includes: measuring an intensity of a signal radiated from the antenna in response to a request from the base station in the operating movable body; transmitting a measurement result to the base
(Continued)

station; and performing failure determination for each of the base stations based on received measurement results for the base station.

12 Claims, 6 Drawing Sheets

(51) Int. Cl.
    *H04B 17/26*     (2015.01)
    *H04B 17/29*     (2015.01)
    *H04B 17/18*     (2015.01)
    *H04B 17/318*     (2015.01)
    *H04L 29/08*     (2006.01)
    *H04W 88/08*     (2009.01)
    *H04W 24/08*     (2009.01)

(52) U.S. Cl.
    CPC ........... *H04B 17/29* (2015.01); *H04B 17/318* (2015.01); *H04L 67/12* (2013.01); *H04W 24/08* (2013.01); *H04W 88/08* (2013.01)

(56) References Cited

U.S. PATENT DOCUMENTS

2006/0141939 A1*   6/2006  Nakada ................. H04W 52/30
                                                                                                        455/69

2013/0215747 A1*   8/2013  Jia ........................... H04L 45/22
                                                                                                         370/235
2014/0126403 A1*   5/2014  Siomina ................ H04W 24/10
                                                                                                         370/252
2014/0128115 A1*   5/2014  Siomina ................ H04L 1/0015
                                                                                                          455/501

FOREIGN PATENT DOCUMENTS

| JP | 2006-186736 A | 7/2006 | | |
|---|---|---|---|---|
| JP | 2008252697 A | 10/2008 | | |
| JP | 2011-124783 A | 6/2011 | | |
| JP | 2012178779 A | 9/2012 | | |
| JP | 2012-244385 A | 12/2012 | | |
| JP | 2013-049395 A | 3/2013 | | |
| JP | 2013197900 A | 9/2013 | | |
| WO | 2011086094 A1 | 7/2011 | | |
| WO | WO-2011086094 A1 * | 7/2011 | ......... | H04L 41/0631 |
| WO | 2015/177992 A1 | 11/2015 | | |

OTHER PUBLICATIONS

International Search Report for PCT/JP2016/051508, dated Mar. 8, 2016.
Communication dated Jul. 31, 2018 from the Japanese Patent Office in counterpart Japanese application No. 2017-503369.

* cited by examiner

METHOD OF DETERMINING FAILURE IN RADIO FACILITY AND MOBILE RADIO SYSTEM

This application is a National Stage of International Application No. PCT/JP2016/051508 filed Jan. 20, 2016, claiming priority based on Japanese Patent Application No. 2015-043651 filed Mar. 5, 2015, the contents of all of which are incorporated herein by reference in their entirety.

TECHNICAL FIELD

The present invention relates to a technique for detecting a failure or a fault in a radio facility, and particularly to: a failure determination method for detecting a failure or a fault in a radio facility, which performs radio communication with a movable body such as a vehicle operating on a route such as a train track or a road, and specifying a fault site; a mobile radio communication system capable of executing such a failure determination method; and an on-board device and a base station constituting such a mobile radio communication system.

BACKGROUND ART

To enable radio communication between a railroad train operating on a train track and an operation command room, for example, on the ground, a train radio system serving as one type of mobile communication system is provided. The train track can be macroscopically considered as one line, and can be considered as two lines close to each other when it needs to be distinguished for each operation direction in a double-track section. Therefore, it is considered that the train radio system may target a region represented by such lines. Thus, the train radio system is generally configured by installing a long or lengthy antenna such as a leaky coaxial cable (LCX) close to a train track and along the train track and connecting a base station to this antenna while arranging an on-board device in the train. The LCX is also referred to as a leaky feeder. In the train radio system using the LCX, a radio wave, which has leaked from the LCX installed along the train track, is received on the train (i.e., an on-board device), to enable communication between the ground side and the train. The LCX is also used as a measure against a neutral zone, which radio waves do not reach, such as a tunnel when a mobile phone service is provided. Note that a train radio system targeting a region having an extent as a plane may also be provided depending on a geographic arrangement of the train tracks.

This type of mobile communication system is configured to supervise base stations in a central control apparatus by arranging base stations with spacing of several kilometers along a route when the route is long, then connecting an LCX to each of the base stations, and connecting the base stations and a central control apparatus to each other via a wired cable. If the spacing between the base stations is longer than the length of a section covered by the one LCX, a plurality of LCXs are arranged along the route, and then each of the LCXs and the base station can also be connected to each other via a relay cable.

To stably operate the mobile communication system represented by the train radio system, it is necessary to quickly detect the occurrence of a failure or a fault in the LCX and the base station connected to the LCX, and then specify the fault site. However, to detect the failure or the fault to specify the fault site, field investigation is generally required, and this requires an enormous cost and time. PTL 1 discloses that a detection sensor including a loop antenna is moved along an LCX to detect a fault from a leakage magnetic field intensity or a leakage electric field intensity as a method of detecting a position of a crack, a fracture, or the like in its initial stage in the LCX with high accuracy. The method discussed in PTL 1 requires an investigator to move with a loop antenna in hand, and eventually requires field investigation by the investigator.

PTL 2 discloses a method of detecting a failure in a transmission line such as an LCX laid along a road or the like, wherein the method enables communication among ground stations (i.e., base stations) by a network, provides a failure detector that monitors an output radio wave from the adjacent ground station at each ground station, and detects the failure particularly based on a change in transmission loss in the transmission line.

CITATION LIST

Patent Literature

[PTL 1] JP H09-159716A
[PTL 2] JP 2000-049669A

SUMMARY OF INVENTION

Technical Problem

As described above, in a mobile communication system including a radio facility including an antenna and base stations installed along a route, field investigation is required to detect a failure or a fault in the radio facility on the ground and specify a fault site, which requires an enormous cost and time.

An example object of the present invention is to provide a method of and a system for determining a failure while a radio facility is being operated with operation of a movable body on a route maintained, detecting a failure or a fault in the radio facility so that a fault site can be specified, without requiring investigation by an investigator in every corner of an installation location.

Solution to Problem

A failure determination method according to an example aspect of the invention is a method that detects a failure site in a radio facility including one or more base stations provided along a route and an antenna installed for each of the base stations along the route while being connected to the base station, a communicable zone being set for each of the base stations, the radio facility performing radio communication with a movable body that operates on the route, the method including measuring an intensity of a signal radiated from the antenna in response to a request from the base station in the operating movable body, transmitting a measurement result to the base station, and performing failure determination for each of the base stations based on received measurement results for the base station.

A mobile communication system according to an example aspect of the invention is a mobile communication system that performs radio communication with a movable body operating on a route, the mobile communication system including: a ground facility including one or more base stations provided along a route and an antenna installed for each of the base stations along the route while being connected to the base station, a communicable zone being set for each of the base stations, the ground facility performing radio communication with a movable body that operates on the route; and an on-board facility provided on the movable body, in which the on-board device includes an on-board controller that measures an intensity of a signal radiated from the antenna in response to a request from the base station and transmits a measurement result to the base station, and the base station performs failure determination based on measurement results for the base station.

An on-board device according to an example aspect of the invention is an on-board device provided in a movable body operating on a route, the on-board device performing radio communication with a ground facility including one or more base stations provided along the route and an antenna installed along the route while being connected to the base stations, the on-board device including: an intensity measurement unit that measures an intensity of a signal radiated from the antenna upon receiving an electric field intensity request from the base station; and an information replying unit that transmits a measurement result in the intensity measurement unit to the base station as a response to the electric field intensity request.

A base station according to an example aspect of the invention is a base station to which an antenna installed along a route is connected and that performs radio communication with a movable body operating on the route via the antenna, the base station including: a storage; and a controller that transmits an electric field intensity request to the movable body via the antenna, receives a response from the movable body for the electric field intensity request, stores a measurement result for an electric field intensity included in the response in the storage, and performs failure determination associated with the base station based on measurement results.

According to the present invention, the fault site can be specified by performing failure determination while the radio facility is being operated with operation of the movable body on the route maintained, without requiring investigation by an investigator in every corner of an installation location.

DESCRIPTION OF EMBODIMENTS

Example embodiments of the invention will be described below with reference to the drawings.

Figure 1:
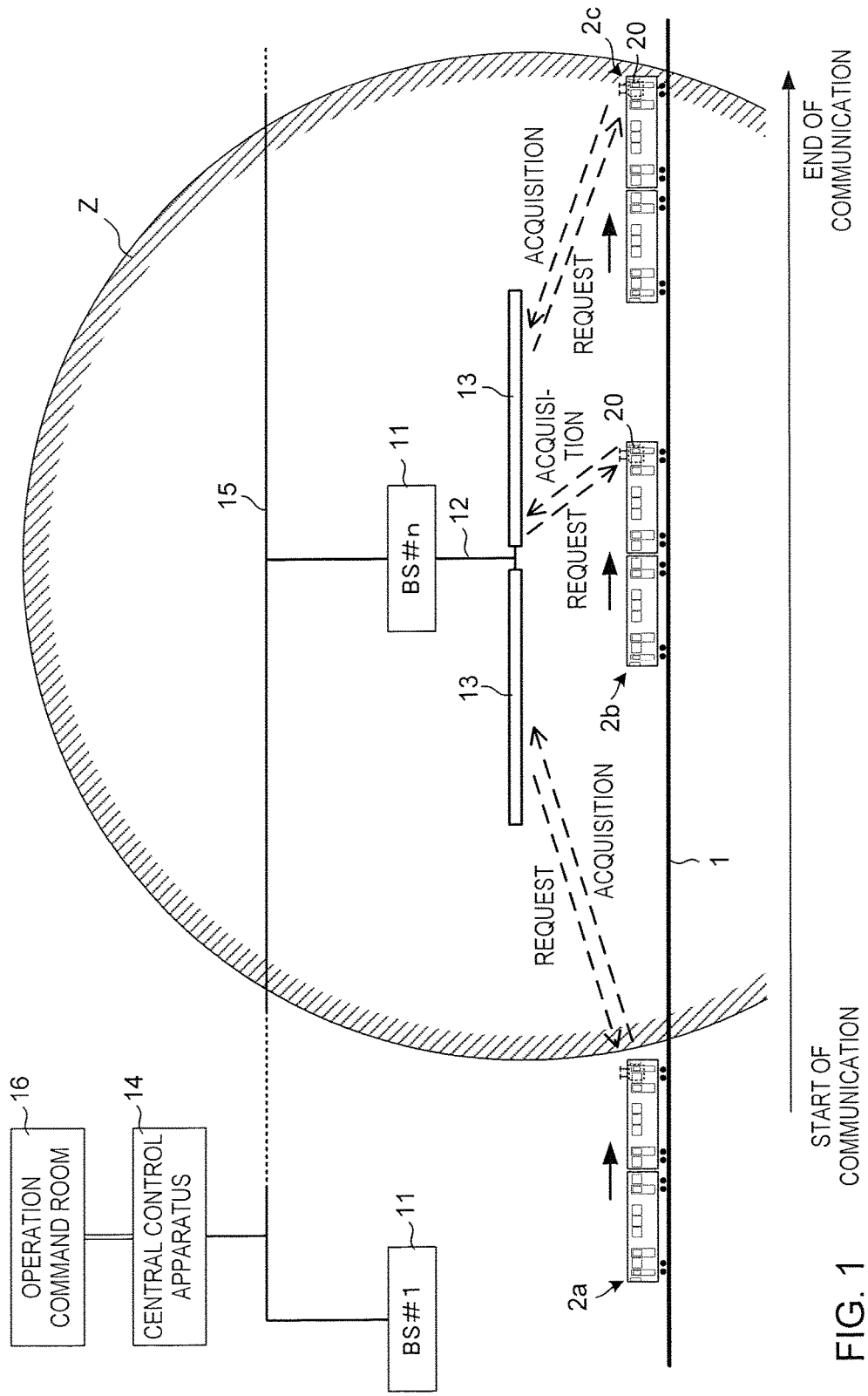
FIG. 1 is a diagram illustrating a configuration of a train radio system to which a fault detection method according to an example embodiment of the invention is applied.

FIG. 1 illustrates a mobile communication system to which an example embodiment of the invention is applied. Here, route 1 is a railroad and railroad train 2 is operating according to a predetermined operation plan (i.e., a train operation diagram), for example, on its train track. Radio communication is performed for train 2 on route 1. In FIG. 1, train 2 is assigned reference sign 2a, 2b, or 2c depending on its position on route 1. The mobile communication system according to the example embodiment is constructed as a train radio system in which a movable body is a train. Note that a similar mobile communication system to the train radio system targeting a railroad or a tramway can also be applied to bus traffic (a BRT (Bus Rapid Transit) system as an example) using an exclusive road or a general road, for example. Therefore, in the present specification, a train track of a railroad or tramway, an aerial tramway, a guideway system, a road, and the like are generically referred to as a route. The mobile communication system according to the example embodiment is not limited to a case where the route is a railroad and a movable body is a train. This mobile communication system can also be applied to a case where the route is an exclusive road and the movable body is a bus operating on the exclusive road, for example. The train also includes not only one configured by connecting rail cars but also one composed of a single rail car.

The train radio system generally includes a ground facility and on-board device 20. On-board device 20 is a radio facility provided on each of trains 2, and exchanges information with the ground facility by a radio wave. On-board device 20 is also referred to as an on-board station, and is provided for each of driver's cabs in a train set. If the train is in a fixed train set, one set of on-board devices 20 may be provided per train set. While both the ground facility and on-board device 20 are respectively radio facilities, the mobile communication system according to the example embodiment is particularly adapted to be able to detect the occurrence of a failure or a fault in the ground facility and easily specify a fault site.

The ground facility includes central control apparatus 14, and one or more base stations (BS) 11 arranged along route 1. Central control apparatus 14 and each of base stations 11 are connected to each other via wired cable 15. Leaky coaxial cable (LCX) 13 is connected to each of base stations 11 via coaxial cable 12. While LCX 13 and wired cable 15 also constitute the ground facility, a fault in base station 11 or LCX 13 is detected as a fault in the ground facility particularly in the example embodiment. LCX 13 functions as an antenna that transmits and receives a radio wave to and from train 2 serving as a movable body, and is installed for each section along route 1 within the section. The central control apparatus is a control apparatus that supervises the whole of one or more base stations 11, and is operated by an operation director managing train operation or a facility director supervising railroad facilities from operation command room 16. A failure determination result is notified to operation command room 16 from central control apparatus 14.

Each of base stations 11 performs radio communication with train 2 on route 1 via LCX 13 connected thereto. A range in which each of base stations 11 is communicable by radio is referred to as zone Z. In the figure, zone Z for n-th base station 11 (i.e., base station #n) is illustrated. In this mobile communication system, zones for the base stations overlap one another in their peripheral borders, and train 2 operating on route 1 can communicate with at least one of base stations 11 while operating. In FIG. 1, train 2a is a train that attempts to enter zone Z, train 2b is a train present within zone Z, and train 2c is a train that attempts to go out of zone Z. In the example embodiment, base station 11 respectively requests trains 2a, 2b and 2c to measure electric field intensities and acquires values of the measured electric field intensities from trains 2a, 2b and 2c.

Figure 2:
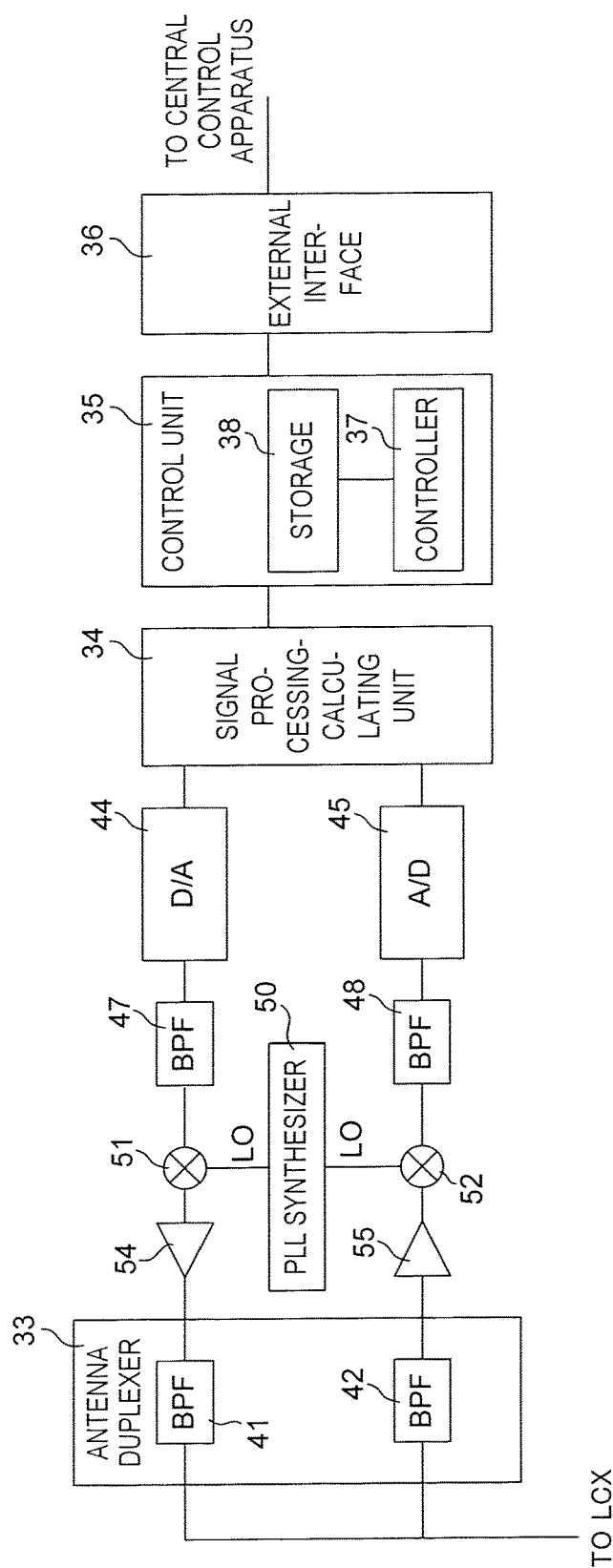
FIG. 2 is a block diagram illustrating a configuration of a base station.

FIG. 2 illustrates an example of a configuration of base station 11. Base station 11 is controlled by central control apparatus 14, and includes: antenna duplexer 33 provided for sharing LCX 13 connected via coaxial cable 12 between transmission and reception; signal processing-calculating unit 34 that performs baseband processing of a signal; control unit 35 that controls entire base station 11; and external interface 36. External interface 36 is used for connection to central control apparatus 14 via wired cable 15. Signal processing-calculating unit 34 includes an FPGA (Field Programmable Gate Array), for example.

Antenna duplexer 33 is provided with bandpass filter (BPF) 41 set to a transmission frequency, and bandpass filter 42 set to a reception frequency. Digital-to-analog converter (D/A) 44, analog-to-digital converter (A/D) 45, bandpass filters 47 and 48, PLL (Phase Locked Loop) synthesizer 50, mixers 51 and 52, power amplifier (PA) 54, and low noise amplifier (LNA) 55 are provided between antenna duplexer 33 and signal processing-calculating unit 34. A local oscillation (LO) frequency for transmission is supplied to mixer 51 from the PLL synthesizer, and a local oscillation frequency for reception is supplied to mixer 52 from the PLL synthesizer. When transmitted toward train 2 from base station 11, a transmission digital signal generated in signal processing-calculating unit 34 is converted into an analog signal by digital-to-analog converter 44. This analog signal is supplied to mixer 51 via bandpass filter 47 and is converted into a transmission signal serving as a signal at a transmission frequency. The transmission signal is amplified by power amplifier 54, is then supplied to LCX 13 via bandpass filter 41 or the like, and is transmitted toward train 2. On the other hand, the signal transmitted from train 2 is received by LCX 13, and is frequency-converted by mixer 52 via bandpass filter 42 and low noise amplifier 55. The frequency-converted signal is supplied to analog-to-digital converter 45 via bandpass filter 48, and is converted into a digital signal. The digital signal from analog-to-digital converter 45 is supplied to signal processing-calculating unit 34.

Control unit 35 is provided with controller 37 that performs actual control processing, and storage 38 that stores data required for control. Storage 38 is configured by various types of memories such as a flash memory, a random access memory, and an eMMC (embedded Multi Media Card). Processing in controller 37 will be described below.

Figure 3:
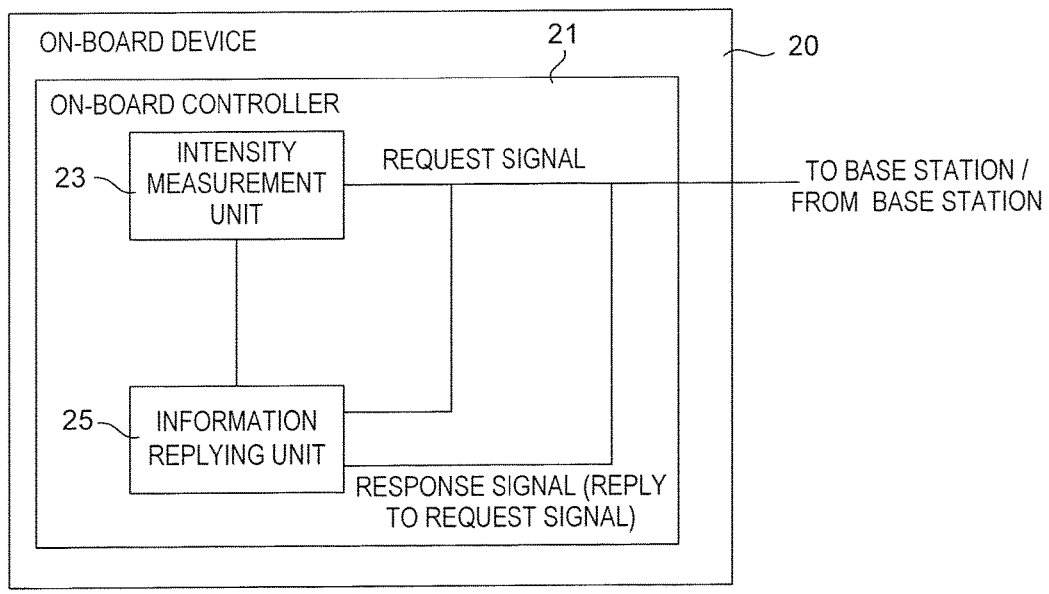
FIG. 3 is a block diagram illustrating an example of a configuration of an on-board device.

On-board device 20 provided in each of trains 2 will be described below. FIG. 3 illustrates an example of a configuration of on-board device 20 used in the mobile communication system according to the example embodiment. On-board device 20 includes on-board controller 21 that measures the intensity of a signal radiated from LCX 13 while train 2 is operating based on a request signal from base station 11 and returns the measurement result, in addition to including: a well-known antenna; high-frequency circuits; and modulation and demodulation circuit for implementing communication by a radio wave with LCX 13. As the high-frequency circuits and the modulation and demodulation circuit in on-board device 20, a similar configuration to the configuration from antenna duplexer 33 to signal processing-calculating unit 34 in the base station illustrated in FIG. 2, for example, can be used. On-board controller 21 includes: intensity measurement unit 23 that measures, upon receiving a request signal from base station 11 via LCX 13, the intensity of the received signal; and information replying unit 25 that transmits, to report a measurement result in intensity measurement unit 23 to base station 11 as a response to the request signal, a response signal representing this measurement result to base station 11. On-board controller 21 can also be configured by dedicated hardware. Alternatively, on-board controller 21 can also be implemented by using a general-purpose computer for control, causing the computer to read a program for causing this computer to function as intensity measurement unit 23 and information replying unit 25, and causing the computer to execute this program.

An operation of the example embodiment will be described below.

Figure 4:
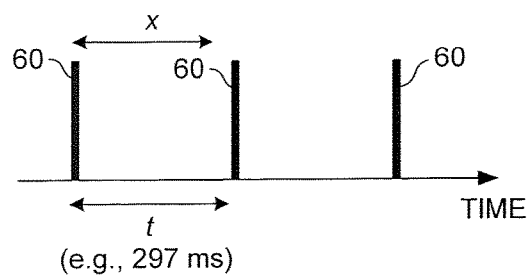
FIG. 4 is a timing chart illustrating a transmission timing of an electric field intensity request.

Here, base stations 11 are arranged every approximately 3 kilometers, for example, along route 1, and a range in which communication can be performed by an electric wave transmitted and received by one base station 11 is defined as one zone. Base station 11 emits request signals 60 representing an electric field intensity request to train 2 in operation, i.e., during commercial operation at an always constant timing, as illustrated in FIG. 4, for example, and judges, if a response signal from train 2 to request signal 60 cannot be received within a designated time period, that train 2 is not present within zone Z for base station 11. A designated time period for receiving the response signal is referred to as an electric field intensity acquisition required time period x. Electric field intensity acquisition required time period x and transition interval t of request signal 60 need not necessarily match each other, and t≥x may be satisfied. However, t=x in the example embodiment. Transmission interval t is 297 milliseconds, for example.

Note that the operation of train 2 in route 1 is generally managed by a train operation management system provided separately from the train radio system. However, if a response signal cannot be received within electric field intensity acquisition required time period x in base station 11 regardless of train 2 present in zone Z for base station 11 by the train operation management system or the like, it can be judged that base station 11 itself has failed or on-board device 20 in train 2 has failed in central control apparatus 14 or operation command room 16. Particularly if the response signal cannot be received within electric field intensity acquisition required time period x for any one of different trains 2 that operate on route 1, it is not easily considered that on-board device 20 in any one of one or more trains 2 has also failed. Therefore, it can be judged that base station 11 itself has failed.

When base station 11 transmits request signal 60 to train 2, train 2 receives request signal 60 via coaxial cable 12 and LCX 13. In on-board device 20 provided in train 2, intensity measurement unit 23 measures the intensity (e.g., electric field intensity) of a signal radio wave from base station 11. Information replying unit 25 generates a response signal including a value of the measured intensity and returns the response signal to base station 11. Base station 11 repeatedly transmits request signals 60 at transmission intervals t, and receives the response signal transmitted from train 2 for each of request signals 60. Controller 37 provided within control unit 35 in base station 11 stores the intensity measurement value included in each of the received response signals in storage 38 within control unit 35, and performs failure determination based on the measurement results for this base station.

As illustrated in FIG. 1, consider a case where train 2 enters zone Z for base station 11. When base station 11 requests an electric field intensity from train 2 using request signal 60, base station 11 receives information including the electric field intensity, i.e., a response signal, from train 2. If train 2 is not present in zone Z, base station 11 cannot acquire this response signal. Therefore, controller 37 in base station 11 sets a threshold timer T for setting how much time receiving of the response signal is waited for after request signal 60 is sent out, and the processing proceeds to subsequent processing. If the response signal cannot be received even if a value of timer T exceeds y [sec], request signal 60 is retransmitted at a subsequent transmission timing of request signal 60.

If a response signal is received within y [sec] from train 2 within zone Z, and information including the electric field intensity can be acquired, controller 37 in base station 11 compares acquired electric field intensity P [dBm] and maximum electric field intensity $P_0$ [dBm] already acquired, and overwrites maximum electric field intensity $P_0$ [dBm] with P and holds the maximum electric field intensity in storage 38 if $P_0 \leq P$. This processing is repeatedly performed with train 2 being present within zone Z, a value of $P_0$ [dBm] is maintained or updated. When train 2 finally goes out of zone Z, this can be detected because the response signal cannot be received within x [sec] from the sending of request signal 60. Therefore, controller 37 in base station 11 finds an absolute value of a difference between $P_0$ stored in storage 38 and reference value $P_b$, compares the absolute value with failure determination threshold value z [dB], and judges normality or a failure.

Figure 5:
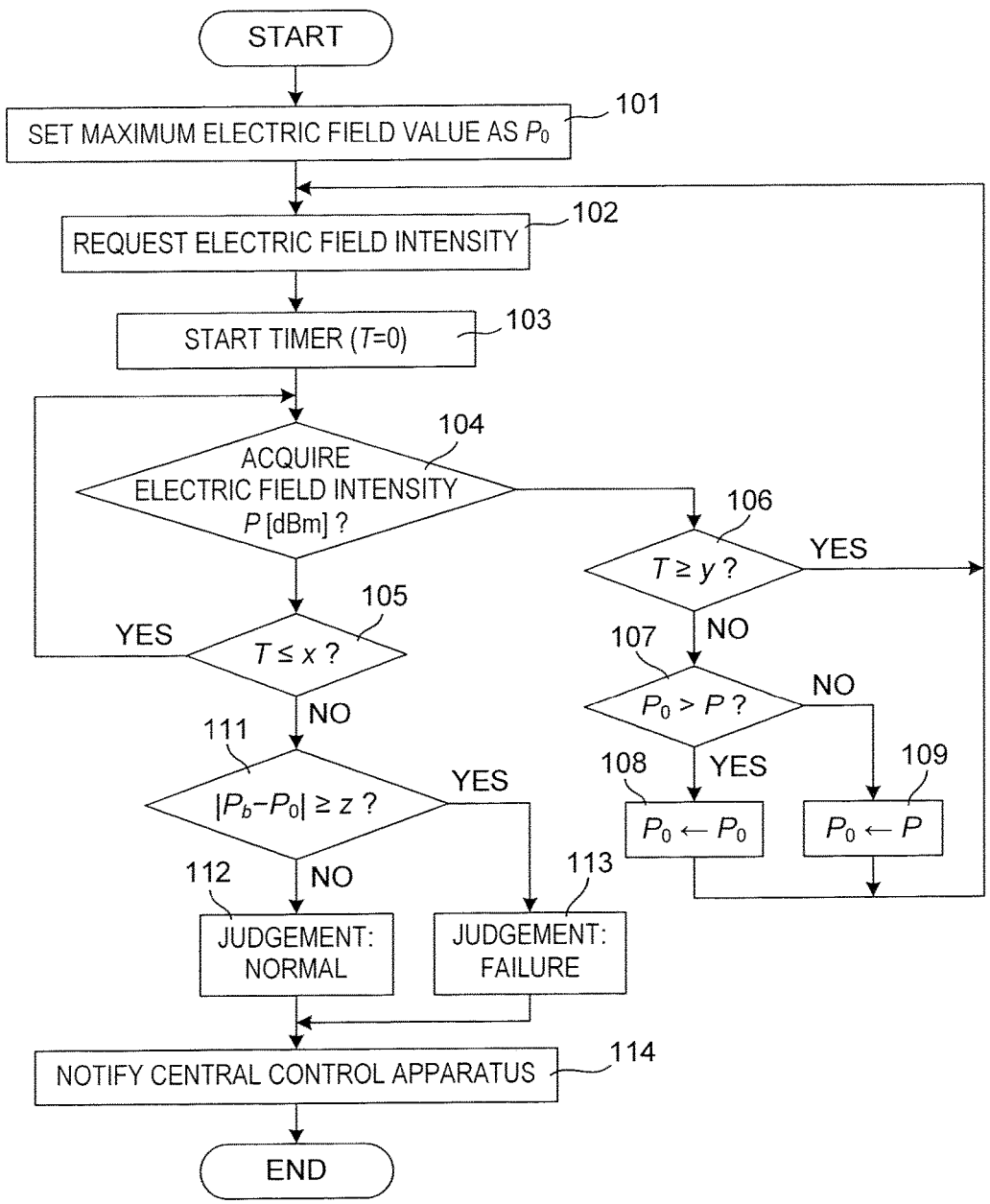
FIG. 5 is a flowchart illustrating a failure determination method according to an example embodiment of the invention.

FIG. 5 illustrates a processing flow of failure determination in base station 11 by illustrating processing performed by base station 11 from the start to the end of communication between base station 11 and train 2. First, in step 101, an initial value of a maximum electric field value is set as $P_0$, and is stored in storage 38. As this initial value, a smaller value than an electric field, which can be received at a normal time by train 2 within zone Z, is desirably set. Then, an electric field intensity is requested using request signal 60 in step 102, and at the same time, a timer is started as T=0 in step 103. Then, it is judged in step 104 whether electric field intensity P has been acquired by receiving a response signal from train 2 or not. If electric field intensity P has not been acquired, it is judged in step 105 whether timer value T is within electric field intensity acquisition required time period x. If $T \leq x$, the processing returns to step 104 to wait for the response signal.

When it is judged in step 104 that electric field intensity P has been acquired, timer value T and y are compared with each other in step 106. If electric field intensity P has been acquired in a shorter time period than y [sec], the processing proceeds to step 107. Otherwise, the processing returns to step 102 to send out succeeding request signal 60. In step 107, acquired electric field intensity P and value $P_0$ that has already been stored in storage 38 are compared with each other. If $P_0 > P$, the processing proceeds to step 108. In step 108, $P_0 = P_0$ is set, i.e., a value of $P_0$ is not changed. If $P_0 \leq P$, the processing proceeds to step 109. In step 109, $P_0 = P$ is set, i.e., $P_0$ is updated by P, and is stored in storage 38. After either one of step 108 and step 109 is executed, the processing returns to step 102. In step 102, succeeding request signal 60 is sent out.

If T>x in step 105, i.e., if the response signal cannot be received even if x [sec] has elapsed since request signal 60 was transmitted, then in step 111, an absolute value of a difference between $P_0$ stored in storage 38 and reference value $P_b$ is found, and is compared with failure determination threshold value z [dB]. If $|P_b - P_0| < z$, the response signal has been able to be so far normally received, and the electric field intensity in train 2 is an appropriate value. Therefore, it is judged in step 112 that base station 11 and LCX 13 are normal, the determination is notified to central control apparatus 14 in step 114, and the processing ends. On the other hand, if $|P_b - P_0| \geq z$ in step 111, the response signal has not been appropriately received regardless of train 2 being present, or the receiving electric field intensity in train 2 has taken an inappropriate value due to a fault in LCX 13, for example. Therefore, it is judged in step 113 that a failure has occurred, the determination is notified to central control apparatus 14 in step 114, and the processing ends. Note that reference value $P_b$ used in step 111 is determined depending on a condition of route 1, and is previously set.

Figure 6:
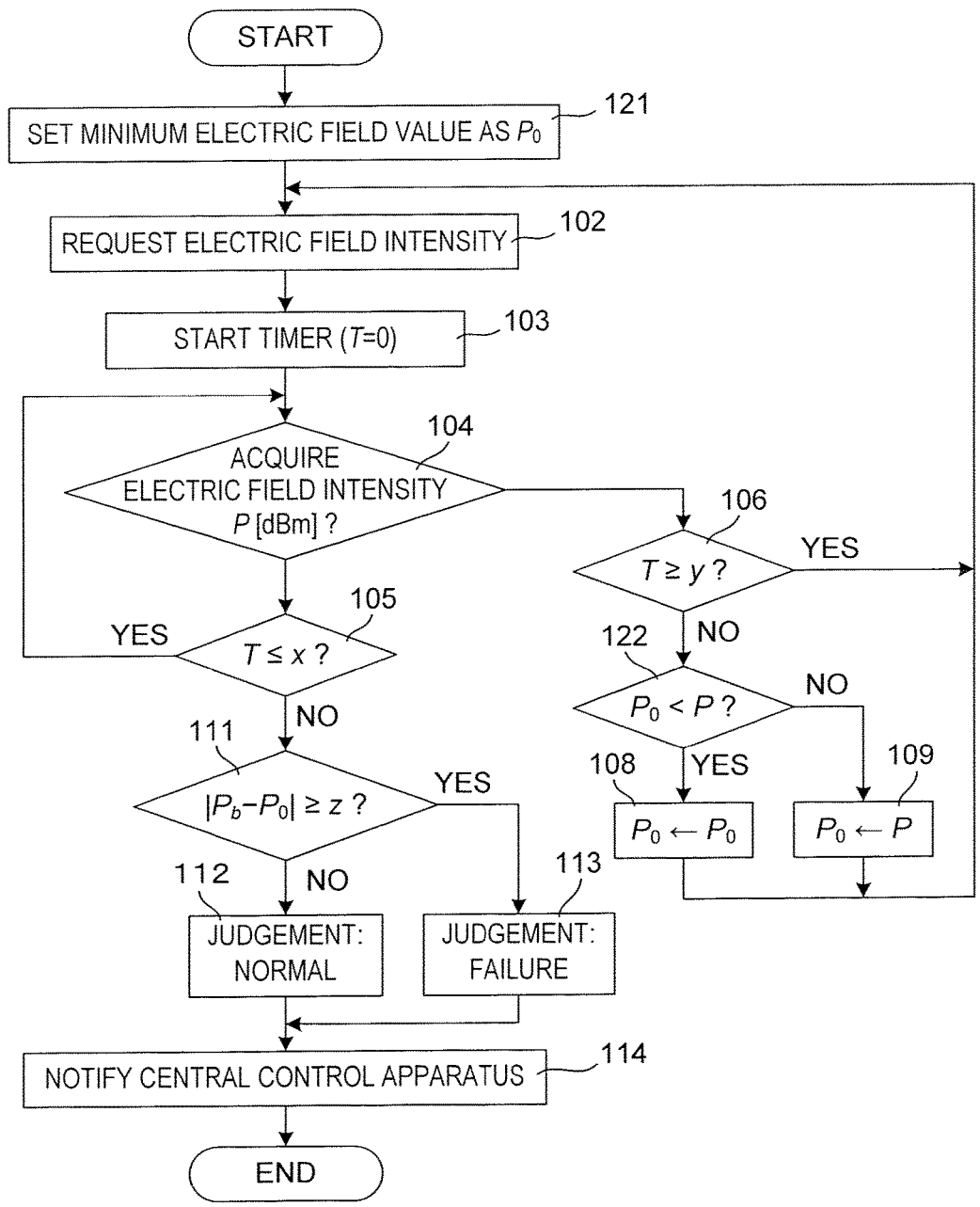
FIG. 6 is a flowchart illustrating a failure determination method according to another example embodiment.

While the failure determination is performed based on the maximum electric field value received by train 2 within zone Z, as described above, failure determination can also be performed based on a minimum electric field value received by train 2 within zone Z. FIG. 6 illustrates a processing flow of base station 11 when failure determination is performed based on a minimum electric field value. In the processing flow illustrated in FIG. 6, step 121 and step 122 are respectively provided instead of step 101 and step 107 in the processing flow illustrated in FIG. 5. In step 121, an initial value of the minimum electric field value is set as $P_0$, and is stored in storage 38. As this initial value, a larger value than an electric field that can be received at a normal time by train 2 within zone Z is desirably set. In step 122, acquired electric field intensity P and value $P_0$ that has already been stored in storage 38 are compared with each other, and it is determined whether $P_0 < P$ or not. If $P_0 < P$, the processing proceeds to step 108. If $P_0 \leq P$, the processing proceeds to step 109. In other points, the processing flow illustrated in FIG. 6 is similar to the processing flow illustrated in FIG. 5, and hence detailed description of thereof is omitted.

A transmission timing of request signal 60 for an electric field intensity request in the example embodiment will be described below.

Figure 7:
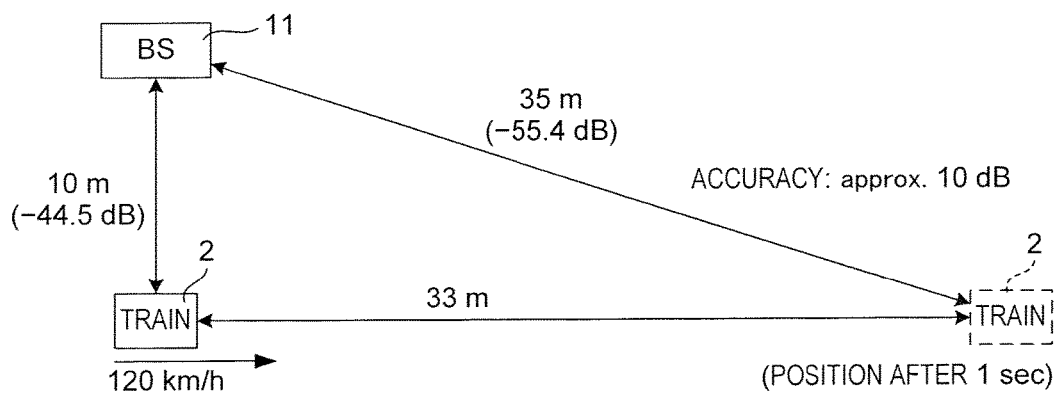
FIG. 7 is a diagram illustrating measurement accuracy when a transmission period of an electric field intensity request is set to one second.

In the example illustrated with reference to FIG. 4, request signal 60 for an electric field intensity request is transmitted every 297 milliseconds, for example. It is assumed that a travelling speed of train 2 in route 1 is 120 km/h, base station 11 is installed in a location spaced 10 m apart from a track of route 1, the track of route 1 is straight, and a frequency used for communication is set to 400 MHz. When transmission interval t of request signal 60 is one second, a distance between train 2 and base station 11 is 10 m when train 2 comes closest to base station 11, as illustrated in FIG. 7. When request signal 60 is transmitted at this timing, a space loss at this time of a radio wave used for communication is −44.5 dB, for example. Train 2 moves through a distance of approximately 33 m on the track one second later. Therefore, a distance between base station 11 and train 2 at that time becomes 35 m, and the space loss becomes −55.4 dB, for example. This means that if request signal 60 is transmitted for each second when train 2 is running at a speed of 120 km/h, measurement accuracy of an electric field intensity on the side of the train becomes approximately 10 dB.

Figure 8:
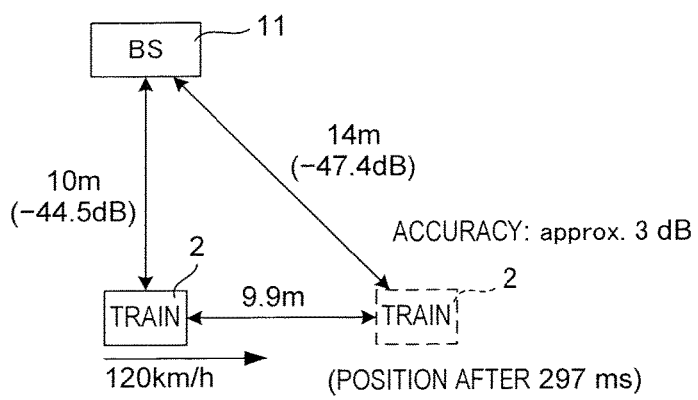
FIG. 8 is a diagram illustrating measurement accuracy when a transmission period of an electric field intensity request is set to 297 milliseconds.

On the other hand, if request signal 60 is transmitted every 297 milliseconds, a movement distance of train 2 during this time is 9.9 m, and the distance between base station 11 and train 2 changes from 10 m to 14 m, as illustrated in FIG. 8. A space loss is −47.4 dB, for example, when the distance between base station 11 and train 2 is 14 m, and differs by approximately 3 dB from that when the distance therebetween is the shortest. Therefore, the measurement accuracy of the electric field intensity on the side of the train is approximately 3 dB. Thus, transmission interval t of request signal 60 can be determined depending on the travelling speed of train 2 and accuracy required for measurement of the electric field intensity.

According to the example embodiment described above, the intensity of a signal radiated from an antenna is measured, in a movable body that is operating, in response to a request from a base station, and failure determination is performed for each base station based on measurement results for the base station. Therefore, a fault site can be specified by performing failure determination while a radio facility is being operated with the operation of the movable body on a route maintained, without requiring investigation by an investigator in every corner of an installation location and without requiring determination of a position by GPS (Global Positioning System) satellites.

If a mobile communication system is a train radio system, for example, an attempt to perform field investigation by an investigator creates a need to stop operation of a train for safety of the investigator, requiring an additional cost and time to specify a fault site. A method according to the example embodiment enables a cost and a time to be reduced because field investigation need not be performed. There is a method of specifying a fault site by measuring a signal intensity in a train that is operating. However, this method becomes difficult to apply to a section in which there are many tunnels when GPS satellites is used to determine a position of the train because position determination by GPS satellites cannot be performed in the tunnel. The method according to the example embodiment enables the fault site to be specified without using GPS satellites. Therefore, the fault can be effectively detected in the tunnel, for example.

A location where an LCX is installed is generally in the tunnel in many cases. However, the LCX has been widely installed parallel to a track on a sound barrier even in a section outside the tunnel. When a metal plate or the like drops in the vicinity of the LCX due to strong wind or the like to interfere with the LCX, there occurs a phenomenon that a receiving electric field intensity on the side of the train becomes weak. If the occurrence of the phenomenon that the receiving electric field intensity becomes weak can be detected, not only a fault in an LCX itself but also a fault state by such a proximity conductor can be specified using a method according to the example embodiment.

The method according to the example embodiment enables not only an LCX but also a faulty antenna to be detected if the antenna is connected to a base station.

Further, according to the example embodiments, there are provided an on-board device and a base station used to detect a failure or a fault in a radio facility and specify a fault site by performing failure determination while the radio facility is being operated with operation of a movable body on a route maintained without requiring investigation by an investigator in every corner of an installation location and without requiring determination of a position by GPS satellites.

While the present invention has been described with reference to example embodiments, it is to be understood that the present invention is not limited to the aforementioned example embodiments. Various alterations, which can be understood by those skilled in the art, can be made for a configuration and details of the present invention without departing from the scope of the present invention.

This application claims priority based on Japanese patent application JP 2015-043651, filed on Mar. 5, 2015, the entire disclosure of which is incorporated herein.

REFERENCE SIGNS LIST

1 Route
2 Train
11 Base station
13 LCX (Leaky Coaxial Cable)
20 On-board device
21 On-board controller
23 Intensity measurement unit
25 Information replying unit
35 Control unit
37 Controller
38 Storage
60 Request signal
Z Zone

The invention claimed is:

1. A failure determination method that detects a failure site in a radio facility comprising one or more base stations provided along a route and an antenna installed for each of the base stations along the route while being connected to the base station, a communicable zone being set for each of the base stations, the radio facility performing radio communication with a movable body that operates on the route, the method comprising:
  measuring an intensity of a signal radiated from the antenna in response to a request from the base station in the operating movable body;
  transmitting a measurement result to the base station; and
  performing failure determination for each of the base stations based on a plurality of received measurement results for the base station,
  wherein the base station periodically transmits an electric field intensity request to the movable body present within the zone for the base station,
  the movable body reports, every time the movable body receives the electric field intensity request, a measurement value of the intensity of the signal at time of the receiving to the base stations,
  for each of the base stations, failure determination associated with the base station is performed based on a plurality of measurement values reported from the movable body, and
  it is determined that a failure has occurred when at least one of: an absolute value of a difference between a maximum value of the reported plurality of measurement values and a reference value exceeds a threshold value; and an absolute value of a difference between a minimum value of the reported plurality of measurement values and a reference value exceeds another threshold value.

2. The failure determination method according to claim 1, wherein when the report from the movable body is not received even if a receiving threshold time has elapsed since the base station transmitted the electric field intensity request, it is judged that the movable body has gone out of the zone for the base station, and the failure determination is performed based on the report received from the movable body before the judgment is performed.

3. The failure determination method according to claim 2, wherein the route is a train track, the movable body is a train, and the measurement of the electric field intensity and the failure determination are performed during commercial operation of the train.

4. The failure determination method according to claim 1, wherein the route is a train track, the movable body is a train, and the measurement of the electric field intensity and the failure determination are performed during commercial operation of the train.

5. A mobile communication system for performing radio communication with a movable body operating on a route, the mobile communication system comprising:
a ground facility comprising one or more base stations provided along a route and an antenna installed for each of the base stations along the route while being connected to the base station, a communicable zone being set for each of the base stations, said ground facility performing radio communication with a movable body that operates on the route, and
an on-board device provided on the movable body,
wherein said on-board device comprises an on-board controller that measures an intensity of a signal radiated from the antenna in response to a request from the base station and transmits a measurement result to the base station,
the base station performs failure determination based on a plurality of measurement results for the base station,
the base station periodically transmits an electric field intensity request to the movable body present within the zone for the base station, and performs failure determination associated with the base station based on a plurality of measurement values reported from the movable body,
the movable body reports, every time it receives the electric field intensity request, a measurement value of the intensity of the signal at time of the receiving to the base station, and
the base station comprises:
a storage that stores a maximum value; and
a controller that compares, every time the measurement value is reported, the measurement value with the maximum value stored in the storage to update the maximum value, and determines that a failure has occurred when an absolute value of a difference between the maximum value stored in the storage and a reference value exceeds a threshold value after a series of reports of the measurement values is finished.

6. The mobile communication system according to claim 5, wherein the base station judges, when it does not receive the report from the movable body even if a receiving threshold time has elapsed since the electric field intensity request was transmitted, that the movable body has gone out of the zone for the base station, and performs the failure determination based on the reports received from the movable body before the judgment is performed.

7. The mobile communication system according to claim 6, wherein the route is a train track, the movable body is a train, and measurement of the electric field intensity and the failure determination are performed during commercial operation of the train.

8. The mobile communication system according to claim 5, wherein the route is a train track, the movable body is a train, and measurement of the electric field intensity and the failure determination are performed during commercial operation of the train.

9. A mobile communication system for performing radio communication with a movable body operating on a route, the mobile communication system comprising:
a ground facility comprising one or more base stations provided along a route and an antenna installed for each of the base stations along the route while being connected to the base station, a communicable zone being set for each of the base stations, said ground facility performing radio communication with a movable body that operates on the route, and
an on-board device provided on the movable body,
wherein said on-board device comprises an on-board controller that measures an intensity of a signal radiated from the antenna in response to a request from the base station and transmits a measurement result to the base station,
the base station performs failure determination based on a plurality of measurement results for the base station,
the base station periodically transmits an electric field intensity request to the movable body present within the zone for the base station, and performs failure determination associated with the base station based on a plurality of measurement values reported from the movable body,
the movable body reports, every time it receives the electric field intensity request, a measurement value of the intensity of the signal at time of the receiving to the base station, and
the base station comprises:
a storage that stores a minimum value; and
a controller that compares, every time the measurement value is reported, the measurement value with the minimum value stored in the storage to update the minimum value, and determines that a failure has occurred when an absolute value of a difference between the minimum value stored in the storage and a reference value exceeds a threshold value after a series of reports of the measurement values is finished.

10. The mobile communication system according to claim 9, wherein the base station judges, when it does not receive the report from the movable body even if a receiving threshold time has elapsed since the electric field intensity request was transmitted, that the movable body has gone out of the zone for the base station, and performs the failure determination based on the reports received from the movable body before the judgment is performed.

11. The mobile communication system according to claim 10, wherein the route is a train track, the movable body is a train, and measurement of the electric field intensity and the failure determination are performed during commercial operation of the train.

12. The mobile communication system according to claim 9, wherein the route is a train track, the movable body is a train, and measurement of the electric field intensity and the failure determination are performed during commercial operation of the train.

\* \* \* \* \*

UNITED STATES PATENT AND TRADEMARK OFFICE
CERTIFICATE OF CORRECTION

| | |
|---|---|
| PATENT NO. | : 10,411,814 B2 |
| APPLICATION NO. | : 15/555690 |
| DATED | : September 10, 2019 |
| INVENTOR(S) | : Takashi Kojima |

Page 1 of 1

It is certified that error appears in the above-identified patent and that said Letters Patent is hereby corrected as shown below:

In the Specification

Column 8, Description of Embodiments, Line 31; Delete "$P_0 \leq P$," and insert --$P_0 \geq P$,-- therefor Signed and Sealed this
Twenty-eighth Day of January, 2020

Andrei Iancu
*Director of the United States Patent and Trademark Office*